United States Patent
Chou et al.

(10) Patent No.: US 7,277,516 B2
(45) Date of Patent: Oct. 2, 2007

(54) ADAPTIVE EQUALIZATION SYSTEM FOR A SIGNAL RECEIVER

(75) Inventors: Gerchih Chou, San Jose, CA (US); Chia-Liang Lin, Union City, CA (US)

(73) Assignee: Realtek Semiconductor Corp, Hsinchu (TW)

( * ) Notice: Subject to any disclaimer, the term of this patent is extended or adjusted under 35 U.S.C. 154(b) by 741 days.

(21) Appl. No.: 10/685,560

(22) Filed: Oct. 14, 2003

(65) Prior Publication Data

US 2005/0078780 A1    Apr. 14, 2005

(51) Int. Cl.
 *H04B 1/10*  (2006.01)
(52) U.S. Cl. ..................................... 375/350
(58) Field of Classification Search ................ 375/229, 375/230, 232, 233, 346, 348, 350, 354, 355, 375/364, 373; 370/516, 518, 519, 520; 379/340, 379/398; 455/63.1, 114.2, 296; 708/323
See application file for complete search history.

(56) References Cited

U.S. PATENT DOCUMENTS

| | | | |
|---|---|---|---|
| 5,959,942 A * | 9/1999 | Taguchi et al. ........ | 369/13.24 |
| 5,991,339 A | 11/1999 | Bazes et al. | |
| 7,003,028 B1 * | 2/2006 | Bishop et al. ............. | 375/232 |
| 2003/0142773 A1 * | 7/2003 | Shirota et al. ............. | 375/373 |
| 2004/0203559 A1 * | 10/2004 | Stojanovic et al. ......... | 455/403 |
| 2004/0252754 A1 * | 12/2004 | Wood et al. ............... | 375/232 |

* cited by examiner

*Primary Examiner*—Khanh Tran
*Assistant Examiner*—Sam Ahn
(74) *Attorney, Agent, or Firm*—Daniel J. Bedell; Smith-Hill and Bedell

(57) ABSTRACT

A communication channel delivers a binary signal representing a data sequence by a pattern of high and low logic levels (symbols) from a transmitter to a receiver. The communication channel low-pass filters the transmitter output signal (VX) so that the signal (VR) arriving at the receiver is a distorted version of the transmitted signal. A receiver processes the received signal to produce an output first data signal (Z) representing the sequence of symbols conveyed by the transmitted signal. The receiver filters the received signal with a transfer function controlled by a control signal to produce a compensated signal (X). The receiver responds to trailing edges of the sampling clock signal by driving the first data signal to a succession of first states, wherein each first state corresponds to a separate leading edge of the sampling clock signal and represents a magnitude of the compensated signal on occurrence of the first state's corresponding sampling clock signal leading edge. The receiver also responds to trailing edges of the sampling clock signal by generating a second data signal by driving the second data signal to a succession of second states. Each second state corresponds to a separate trailing edge of the sampling clock signal and represents a magnitude of the compensated signal on occurrence of the second state's corresponding sampling clock trailing edge. The receiver generates the filter control signal as a function of the first and second data signals.

20 Claims, 6 Drawing Sheets

ADAPTIVE EQUALIZATION SYSTEM FOR A SIGNAL RECEIVER

BACKGROUND OF THE INVENTION

1. Field of the Invention

The present invention relates to an equalization system for a signal receiver that adaptively adjusts equalization based on comparisons of samples of an equalized signal acquired both on leading and trailing edges of a sampling clock signal.

2. Description of Related Art

Binary signal can represent digital data sequences in various ways. For example, a typical non-return to zero (NRZ) transmitter transmits a signal representing a digital data sequence using a high (positive) level to represent a digital "1" data bit and a low (negative) level to represent a "0" data bit. FIG. 1 depicts an NRZ waveform VX organized into a succession of high or low voltage levels ("symbols") wherein each symbol represents a separate bit of a data sequence, in this example the sequence {1001011001001101}. A sequence of symbols in a binary signal can represent a bit sequence in other ways. For example in a "non-return to zero inverted" (NRZI) signal each symbol corresponds to a separate bit of a data sequence, but rather than indicating the state of its corresponding bit, each symbol indicates whether its corresponding bit has the same state as a preceding bit of the sequence. A high voltage level symbol (H) indicates that the corresponding bit has the same state as its preceding bit and a low voltage level symbol (L) indicates that its corresponding bit's state differs from a preceding bit's state. Thus, an NRZI signal would represent the sequence {1001011001001101} by the symbol sequence {HLHLLLHLHLLHLHLL}.

While a transmitter may transmit a binary signal looking like signal VX, a communication channel (such as, for example a cable or a transmission line) conveying that signal to a receiver will distort the signal. A communication channel typically acts like a low-pass filter attenuating a signal's high frequency components more than its low frequency components. While transmitted signal VX departing a transmitter exhibits relatively sharp transitions between 1 and 0 symbols as illustrated in FIG. 1, the channel will smooth those sharp transitions as it delivers the signal to a receiver. Hence, a receiver might receive a signal looking for example like waveform VR of FIG. 1 rather than like the transmitted signal VX. This type of channel distortion is known as "intersymbol interference" (ISI) because states of more than one symbol can affect the voltage of the received signal VR at any given time. All NRZ, NRZI and other types digital signals are susceptible to ISI interference.

When ISI distortion is severe, a receiver would not be able to directly recover the symbol sequence represented by transmitted signal VX simply by digitizing received signal VR. A receiver should therefore include an equalization system for processing received signal VR to compensate for ISI distortion. For example, waveform X of FIG. 1 illustrates an equalized version of the received signal VR wherein the effects of ISI distortion are substantially reduced. Note that a receiver could sample compensated signal X on each leading edge of a sampling clock CLK having an appropriate phase and frequency to produce an output signal Z conveying the same symbol sequence as VX.

FIG. 2 illustrates a transmitter 6 transmitting signal VX through a channel 8 forwarding an ISI distorted version VR of the transmitted signal to a receiver 10. Receiver 10 employs a typical prior art "adaptive feed-forward" equalization system including a filter 12 for processing signal VR to produce a compensated signal X. A clock and data recovery (CDR) unit 14 periodically samples signal X to produce an output data signal Z conveying a sequence of symbols matching that of transmitted signal VX. CDR unit 14 automatically generates the sampling clock signal CLK controlling the phase and frequency with which it samples signal X and supplies both the data signal and the clock signal CLK as outputs.

Since ISI distortion occurs because the channel 8 acts like a low pass filter, filter 12 high-pass filters the VR signal to compensate for the ISI distortion. An adaptation control unit 16 supplies a control signal C to filter 12 for adjusting the filter's frequency response so that it provides an appropriate level of equalization. CDR circuit 14 generates a "jitter estimate" signal J indicating how well filter 12 compensates the VR signal for ISI distortion. As compensation improves, the average amplitude of J decreases. Adaptation control circuit 16 therefore adjusts control signal C to minimize the average magnitude of signal J, thereby optimizing the equalization provided by filter 12.

FIG. 3 illustrates CDR unit 14 of FIG. 2 in more detailed block diagram form. A latch 18 samples signal X on leading edges of the CLK signal to produce a signal Y, and a latch 20 samples signal Y on trailing edges of the CLK signal to produce the data signal Z. An XOR gate 22 receiving the X, Y signals generates a signal U, and an XOR gate 24 receiving the Y and Z signal generates a signal D. A summer 26 offsets U by D to provide a signal E representing an error in the phase of sampling clock signal CLK relative to its ideal sampling phase. A low pass filter 27 filters error signal E to supply a control voltage input VC to a voltage-controlled oscillator (VCO) 28 producing sampling clock signal CLK. Signal VC also controls a delay circuit 30 for delaying signal U by one half cycle of the CLK signal to produce a signal U'. An XOR gate 32 receiving signals U' and D generates jitter estimate signal J.

FIG. 4 is a timing diagram illustrating behavior of various signals of CDR unit 14 of FIG. 3 when rising edges of the CLK signal arrive at latch 18 of FIG. 3 too early, ahead of the middle of symbols of signal X. Timing diagram FIG. 5 illustrates behavior of the same signals when edges of sampling clock signal CLK arrive at latch 18 too late, after the middle of symbols represented by signal X. Referring to FIGS. 4 and 5, pulses of signals U and D occur after each symbol transition in signal X, but while D signal pulses always have a 50% duty cycle, U signal pulses will have a less than 50% duty cycle when CLK signal edges occur too soon, as illustrated in FIG. 4, and will have a greater than 50% duty cycle as illustrated in FIG. 5 when sampling clock signal edges occur too late. The average voltage of error signal E, the difference between U and D signal voltages, will therefore be positive when clock signal edges arrive too soon and will be negative when clock signal edges arrive too late. Low pass filter 27 and VCO 28 adjust the sampling clock signal phase to keep the average voltage of signal E as close to zero as possible, thereby keeping the sampling clock signal phase as close as possible to ideal.

When sampling clock signal CLK has the ideal sampling phase, and signal X is perfectly equalized, rising edges of the sampling clock signal occur at the middle of signal X symbols and signals D and U' are identical. Since signal J is the exclusive OR of signals D and U', signal J remains continuously low. However when equalization is less than perfect, levels of signals D and U' will differ at times, the average magnitude of jitter estimate signal J will be non-zero and it will increase with the equalization error. Adaptation control unit 16 of FIG. 2 therefore continuously monitors jitter estimate signal J and adjusts the control input C to filter 12 to set the level of filter 12 provides to minimize the average magnitude of signal J.

Although adaptation control unit 16 and filter 12 can substantially compensate for ISI distortion, channel noise and the feedback through adaptation control unit will cause signal X to exhibit some amount of jitter. FIG. 6 includes an "eye diagram" of a poorly equalized signal X showing the range of magnitudes signal X could exhibit when monitored by an oscilloscope clocked by the CLK signal. FIG. 7 illustrates a better-equalized signal X exhibiting less jitter. The average amplitude of jitter estimate signal J is proportional to the amount of jitter in signal X relative to sampling clock signal CLK.

A typical high-pass filter 12 implements the following s-domain transfer function:

$$H(s)=(s+z)/(s+p)$$

including a single zero z and a single pole p. Adaptation control unit 16 may adjust zero z and/or pole p to minimize jitter. For example, an adaptation control unit that adjusts only zero z will slowly increase the magnitude of z until the average magnitude of jitter estimate signal J starts to increase and then slowly decrease z until the average magnitude of J begins to increase. Such a feedback control system will cause pole z to oscillate slightly about a value that minimizes the average magnitude of jitter estimate signal J, thereby ensuring that filter 12 provides an appropriate level of equalization.

FIG. 8 illustrates a transmitter 6 transmitting a signal through a channel 8 to a prior art receiver 34 employing an "adaptive feedback" equalization system. Receiver 34 includes a summing amplifier 38 for offsetting the received signal VR by an offset signal A to produce an equalized signal X. A CDR unit 40 generates sampling clock CLK, digitizes signal X using the sampling clock as a timing reference to produce an output data signal Z and generates an error estimate signal J. An adaptation control unit 42 processes the error estimate signal J to supply a compensation control signal C to a filter 44. Filter 44 filters output signal Z with a frequency response controlled by signal C to produce the compensation signal A input to summing amplifier 38. CDR unit 40 and adaptation control circuit 42 can be similar to CDR unit 14 and adaptation control unit 16 of FIG. 2, but while filter 12 of FIG. 2 is a high pass filter, filter 44 of FIG. 8 is a low pass filter.

One drawback to the adaptive equalization systems employed by the receivers of FIGS. 2 and 8 is that the circuitry needed to generate a jitter estimate signal J can be costly. What is needed is an equalization system for a signal receiver that does not require a jitter estimate signal.

BRIEF SUMMARY OF THE INVENTION

The invention relates to a communication system wherein a communication channel delivers a binary signal representing a data sequence by a pattern of high and low logic levels (symbols) from a transmitter to a receiver. The communication channel low-pass filters the transmitter output signal (VX) so that the signal (VR) arriving at the receiver is a distorted version of the transmitted signal. The invention relates in particular to a receiver, or to a method the receiver employs, for processing the received signal to produce an output first data signal (Z) representing the sequence of symbols conveyed by the transmitted signal.

In accordance with the invention, the receiver attenuates low frequency components of the received signal by an amount controlled by at least one filter control signal to produce a compensated signal (X). The receiver processes the compensated signal to generate a sampling clock signal (CLK) having a plurality of successive cycles of substantially uniform duration wherein a leading edge of the sampling clock signal occurs at a start of each sampling clock signal cycle and a trailing edge of the sampling clock signal occurs substantially at a middle of each sampling clock signal cycle. The receiver samples the compensated signal on each leading edge of the sampling clock signal to produce the first data signal and samples the compensated signal on each trailing edge of the sampling clock signal to produce a second data signal (S). The receiver generates the filter control signal(s) as function(s) of the first and second data signals.

Rather than controlling the amount of compensation based on a jitter estimate signal derived from the compensated signal, a receiver in accordance with the invention controls the amount of ISI compensation based on comparisons of samples of the compensated signal X acquired on leading edges of the sampling clock signal and samples of compensated signal acquired on the trailing edges of the sample clock. Since the hardware needed to generate and process data signals S and Z is relatively simple and inexpensive compared to the hardware prior art equalization systems need to generate and process a jitter estimate signal, the invention reduces equalization system costs.

The claims appended to this specification particularly point out and distinctly claim the subject matter of the invention. However those skilled in the art will best understand both the organization and method of operation of what the applicant considers to be the best modes of practicing the invention, together with further advantages and objects of the invention, by reading the remaining portions of the specification in view of the accompanying drawings wherein like reference characters refer to like elements.

DETAILED DESCRIPTION OF THE INVENTION

The present invention relates to an adaptive equalization system for a signal receiver. While the specification describes exemplary embodiments of the invention considered best modes of practicing the invention, the invention need not be limited to the exemplary embodiments described below. Those of skill in the art will appreciate that other modes of practicing the invention are possible.

Adaptive Feed-forward Equalization

Figure 1:
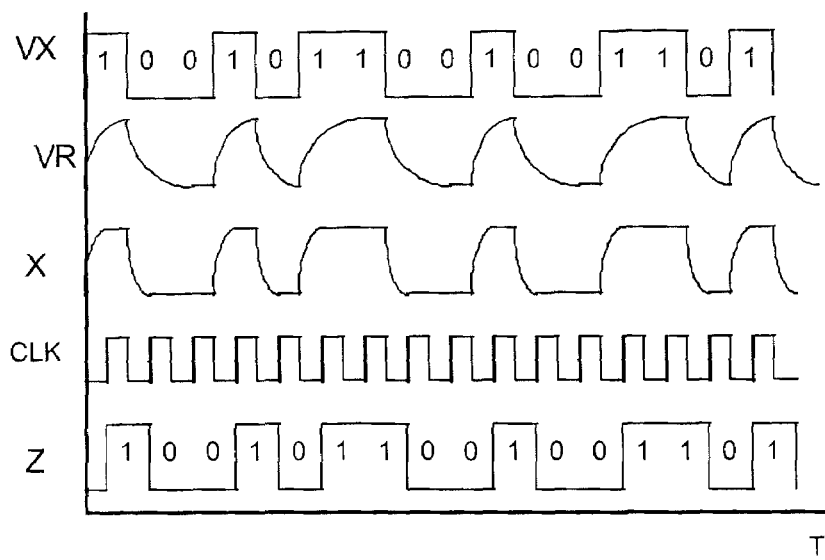
FIG. 1 is a timing diagram illustrating various waveforms generated by a system for transmitting and receiving a signal through a communication channel.
Figure 9A:
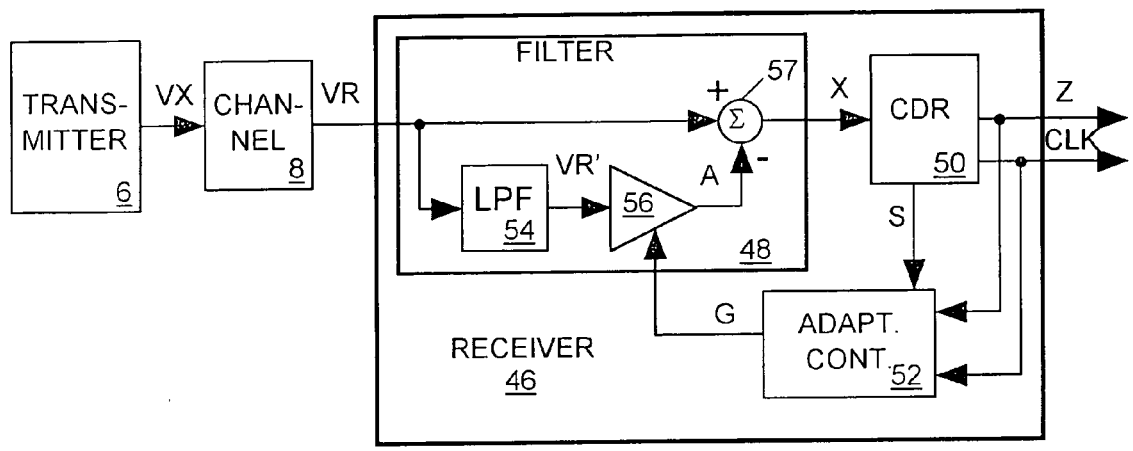
FIGS. 9A-9C illustrate in block diagram form alternative exemplary embodiments of a communication system including a receiver employing an adaptive feed-forward equalization system in accordance with the invention.

FIG. 9A depicts a communication system including a transmitter 6 for transmitting a digital signal VX to a communication channel 8 delivering a distorted version VR of transmitted signal VX as input to a receiver 46 in accordance with the invention. As illustrated in FIG. 1, transmitted signal VX includes a succession of data cycles of uniform duration and during each data cycle, the VX signal may be of a high or low voltage level. The pattern of high and low voltage levels ("symbols") represents a data sequence. For example, transmitted signal VX could be a non-return to zero (NRZ) signal or a non-return to zero inverted (NRZI) signal. Communication channel 47 can distort received signal VR in several ways, for example, by attenuating, offsetting or filtering transmitted signal VX. The present invention relates to an equalization system receiver 46 employs to compensate the VR signal for the type of distortion channel 8 causes when it low-pass filters the transmitted signal VX. For simplicity of illustration, FIG. 9 depicts receiver 46 as compensating only for this type of channel distortion, but those of skill in the art will appreciate that, when necessary, receiver 46 could be adapted to also include conventional systems such as for example an automatic gain control circuit or a baseline wander correction system for also compensating for other kinds of signal distortion.

FIG. 1 compares an example transmitted signal VX to a corresponding received signal VR when channel 8 low-pass filters the transmitted signal to produce the received signal. Note that while level transitions in the VX signal are relatively abrupt, they occur so slowly in the VR signal that received signal VR signal will often fail to reach an appropriate logic level following a state transition in transmitted signal VX. We call this type of channel distortion "intersymbol interference" (ISI) because more than one symbol of transmitted signal VX can influence the voltage of received signal VR at any time.

Figure 2:
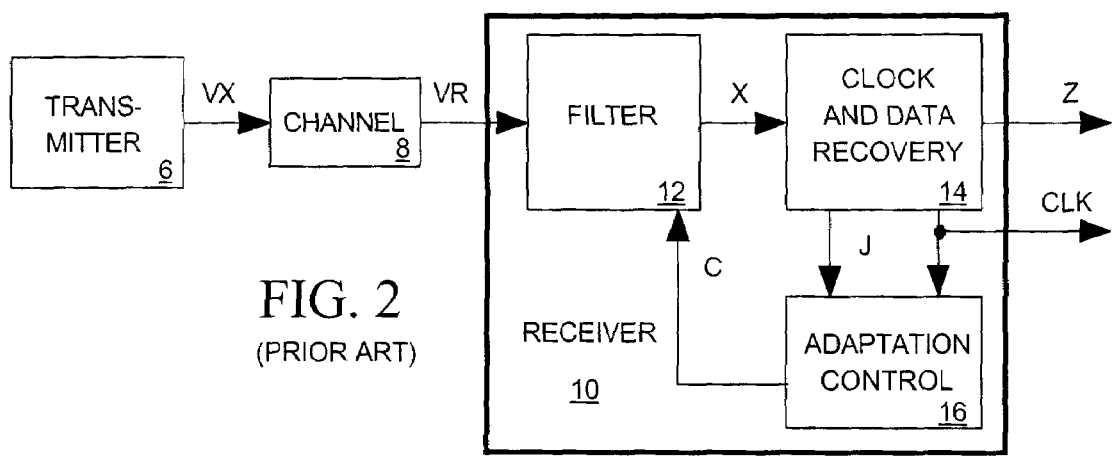
FIG. 2 illustrates a prior art communication system in block diagram form.
Figure 3:
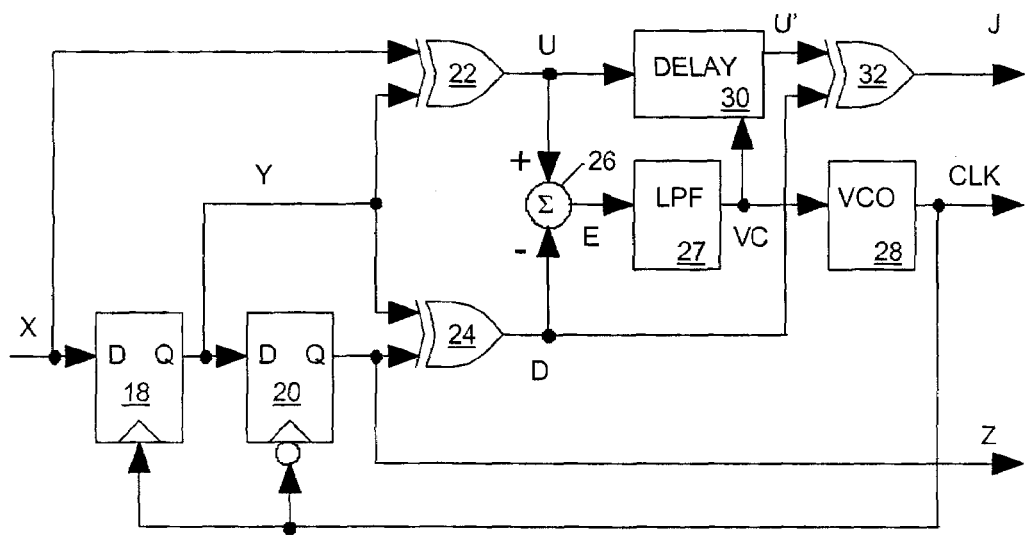
FIG. 3 illustrates the CDR unit of FIG. 2 in more detailed block diagram form.

When ISI distortion is sufficiently large, some symbols of the VR signal can be so distorted that it is not possible to directly digitize that signal to recover the symbol sequence of transmitted signal VX. Receiver 46 therefore includes an filter 48 for high-pass filtering the received signal VR to compensate for the low-pass filtering effect of channel 8, thereby producing a compensated signal X having somewhat more abrupt transitions than the received signal VX. Note that compensated signal X looks more like transmitted signal VX than received signal VR and that it would be possible to determine the symbol sequence conveyed by the transmitted signal VX by sampling compensated signal X on each leading edge of a sampling clock signal CLK depicted in FIG. 2.

A clock and data recovery (CDR) unit 50 therefore processes signal X to generate a 50% duty cycle sampling clock signal CLK having plurality of successive cycles of substantially uniform duration wherein each leading edge of the sampling clock signal occurs at a start of each sampling clock signal cycle and each trailing edge of the sampling clock occurs substantially midway through each sampling clock signal cycle. CDR unit 50 adjusts the phase and frequency of sampling clock signal CLK so that trailing edges of the sampling clock signal occur when compensated signal X is transitioning between states, thereby ensuring that by sampling compensated signal X on each leading edge of the sampling clock signal, CDR unit 50 can produce an output first data signal Z having a succession of states representing the succession of symbols conveyed by transmitted signal VX. In the examples provided herein, each rising edge of sampling clock signal CLK is treated as a "leading" edge and each falling edge is treated as a "trailing" edge of the sampling clock signal. However, those of skill in the art will appreciate that clock signal polarity is a matter of design choice and that in alternative embodiments of the invention, falling edges may be treated as leading edges and rising edges may be treated as trailing edges.

CDR unit 50 samples compensated signal X on each trailing edge of sampling clock signal CLK to produce a second data signal S having a succession of states representing the polarity of the sampling clock signal on each sampling clock signal trailing edge. An adaptation control unit 52 processes the first and second data signals Z and S to determine how to adjust a filter control signal G supplied to filter 48 for controlling the amount of compensation filter 48 provides. Filter 48 includes a low-pass filter (LPF) 54, an amplifier 56, and a summer 57. LPF 54 filters received signal VR and amplifier 56 amplifies the output VR' of LPF 54 with a gain controlled by filter control signal G to produce an offset signal A. Summer 57 offsets received signal VR by offset signal A to produce compensated signal X. Filter 48 acts as a high-pass filter because summer 57 attenuates a portion (offset signal A) of the low frequency components of VR to produce compensated signal X. Since filter control signal G controls the magnitude of offset signal A, signal G controls the amount by which filter 48 attenuates low frequency components of VR. The transfer function of low-pass filter 54 is selected to compensate for the low-pass transfer function of channel 8 and will therefore depend on the nature of channel 8. A filter 54 implementing the simple low-pass s-domain transfer function $p/(s+p)$ will provide adequate compensation for many typical kinds of channels with the fixed value of p appropriately selected relative to the nature of channel 8.

Figure 9B:
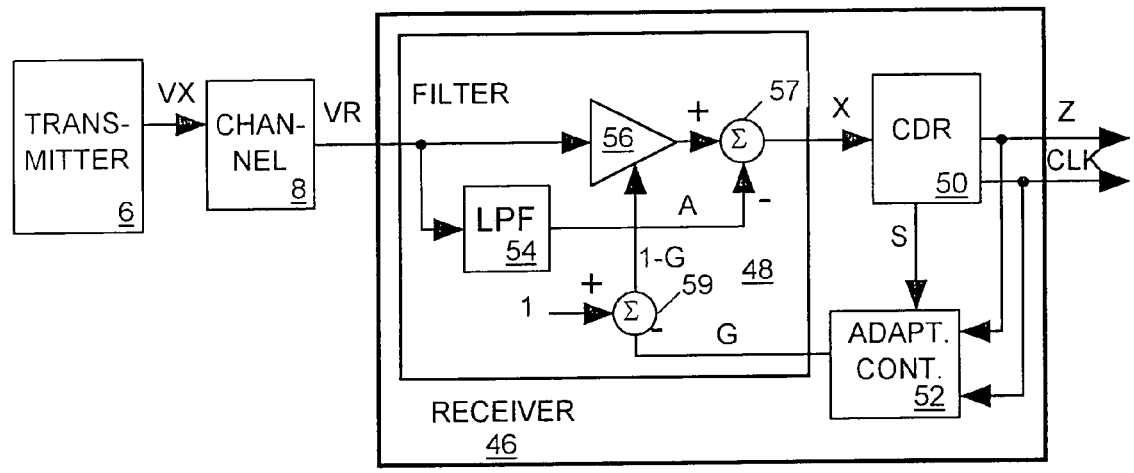

FIG. 9B depicts a communication system in accordance with the invention that is generally similar to that of FIG. 9A except that filter 48 is implemented differently. In the filter 48 of FIG. 9B, amplifier 56 amplifies the VR signal rather than the output VR' of low pass filter 54. A summer 59 subtracts the output G of adaptation control circuit 52 from 1 to produce a gain control signal 1-G supplied as input to amplifier 56.

Figure 9C:
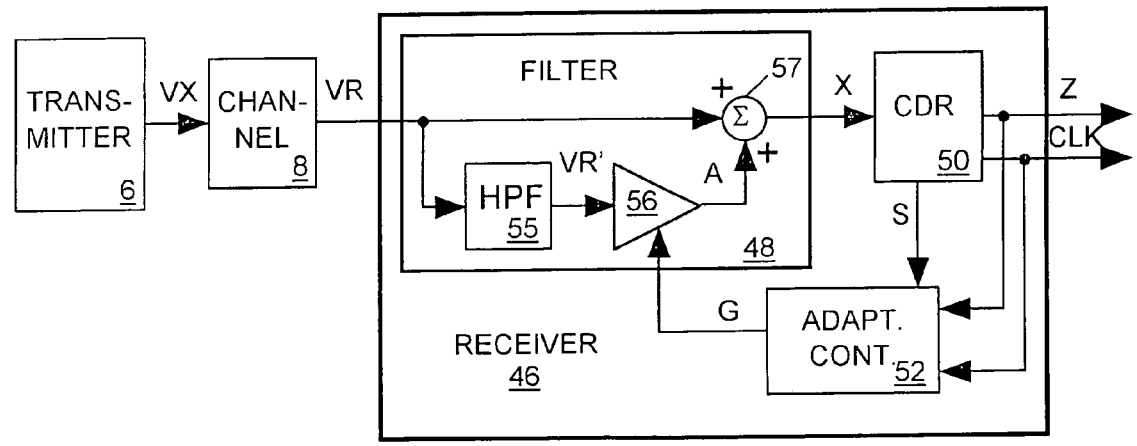

FIG. 9C depicts a communication system in accordance with the invention that is also generally similar to that of FIG. 9A except for differences in filter 48. In the filter 48 of FIG. 9C, the low pass filter 54 of FIG. 9A is replaced with a high pass filter 55. Also summer 57 of FIG. 9C adds VR and A rather than subtracting A from VR as in FIG. 9A. Thus while the filters 48 of FIGS. 9A and 9B attenuate low frequency components of VR to produce compensated signal X, the filter 48 of FIG. 9C amplifies the high frequency components of signal VR to produce compensated signal X.

Figure 10:
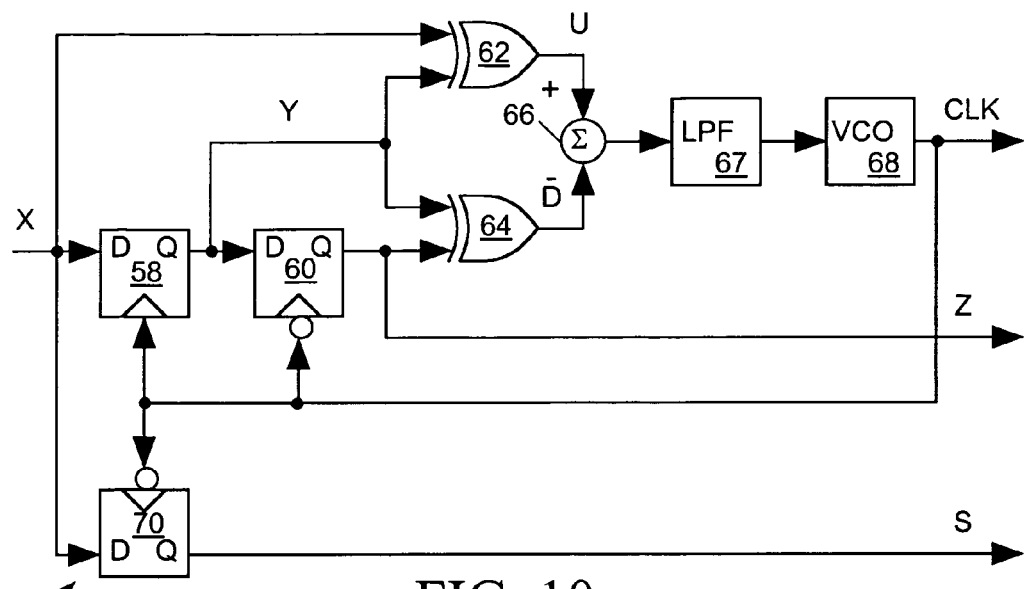
FIG. 10 illustrates the CDR unit of FIG. 9 in more detailed block diagram form.

FIG. 10 illustrates CDR 50 of FIG. 9 in more detailed block diagram form. A latch 58 samples compensated signal X on leading edges of the CLK signal to produce a signal Y, and a latch 60 samples signal Y on trailing edges of the CLK signal to produce the first data signal Z. An XOR gate 62 receiving signals X and Y generates a signal U, an XOR gate 64 receiving signals Y and Z generates a signal D, and a summer 66 offsets U by E to generate a signal E. Signal E represents an error in the phase of sampling clock signal CLK relative to its ideal sampling phase. A low pass filter 67 filters signal E to supply a control voltage input VC to a voltage-controlled oscillator (VCO) 68 producing sampling clock signal CLK. A latch 70 samples the signal X on the trailing edge of clock signal CLK to produce the second data signal S.

Figure 11:
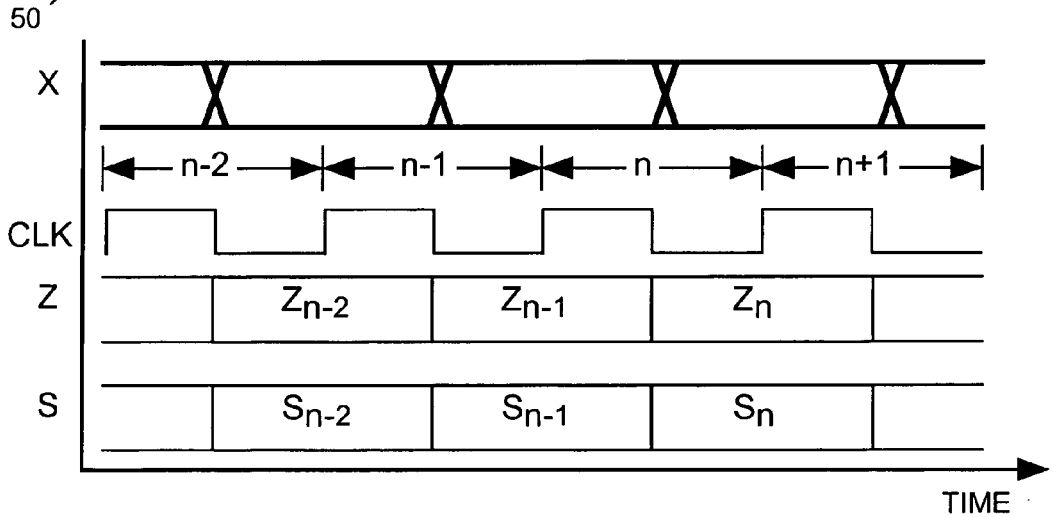
FIG. 11 is a timing diagram illustrating behavior of signals produced by the CDR unit of FIG. 10.

FIG. 11 illustrates the X, CLK, Z and S signals of FIGS. 10 and 11 as functions of time. The state $Z_n$ of first data signal Z following the $n^{th}$ sampling clock signal trailing edge indicates whether compensated signal X was at its high or low logic level on the $n^{th}$ sampling clock signal leading edge. The state $S_n$ of the second data signal S following the $n^{th}$ sampling clock signal trailing edge indicates whether compensated signal X was closer to its high logic level or to its low logic level on the $n^{th}$ sampling clock signal trailing edge. When the gain of amplifier 56 of FIG. 9 is too low, filter 48 does not provide a sufficient amount of compensation and symbols $S_{n-1}$ and $Z_{n-2}$ will have the same sign more often than they will have differing signs. This tells adaptation control unit 52 to increase the gain of amplifier 56 by increasing the magnitude of G. Conversely, when filter 48 over-compensates VR, $S_{n-1}$ and $Z_{n-2}$ will have differing signs more often then they will have the same signs, thereby telling adaptation control unit 52 to decrease the gain of amplifier 56. For example, adaptation control circuit 52 may implement the transfer function:

$$G_{n+1}=G_n+\Delta_+, \text{ when } S_{n-1}=Z_{n-2}, \text{ else } G_{n+1}=G_n-\Delta_-$$

where $G_n$ is a magnitude of the one filter control signal during an $n^{th}$ sampling clock signal cycle, $G_{n+1}$ is a magnitude of the one filter control signal during an $(n+1)^{th}$ sampling clock signal cycle, $Z_{n-2}$ is a state of the first data signal following an $(n-2)^{th}$ trailing edge of the sampling clock signal, $S_{n-1}$ is a state of the second data signal following an $(n-1)^{th}$ trailing edge of the sampling clock signal, and $\Delta_+$ and $\Delta_+$ are constants.

Figure 12:
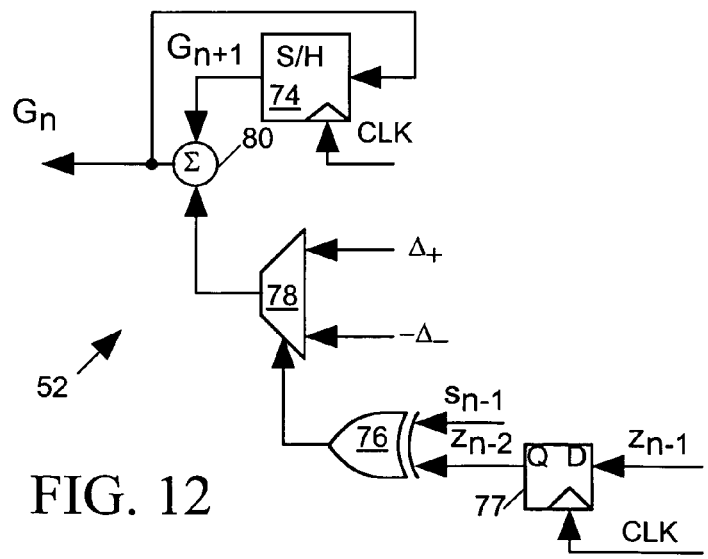
FIG. 12 illustrates the adaptation control unit of FIG. 9 in more detailed block diagram form.

The constants $\Delta_+$ and $\Delta_-$ are suitably no smaller than needed to ensure stability of the feedback path though adaptation control circuit 52. $\Delta_+$ and $\Delta_-$ can be, but may not necessarily be the same. When $\Delta_+$ and $\Delta_-$ are set to be the same, the adaptation control will adjust the filter 48 until $S_{n-1}$ and $Z_{n-2}$ are of the same sign 50% of the time. An adaptation control circuit 52 implementing this transfer function will keep the gain of amplifier 56 of FIG. 9 near a value that optimizes the compensation provided by filter 48. FIG. 12 illustrates an example adaptation control circuit 52 providing the above transfer function requiring only a sample and hold (S/H) circuit 74, an XOR gate 76, a latch 77, a multiplexer 78 and a summing amplifier 80.

Adaptation control unit 52 could implement other transfer functions such as for example:

$$G_{n+1}=G_n, \text{ when } Z_n=Z_{n-1},$$

$$\text{else } G_{n+1}=G_n+\Delta_+, \text{ when } S_{n-1}=Z_{n-2},$$

$$\text{else } G_{n+1}=G_n-\Delta_-.$$

where $G_n$ is a magnitude of the one filter control signal during an $n^{th}$ sampling clock signal cycle, $G_{n+1}$ is a magnitude of the one filter control signal during an $(n+1)^{th}$ sampling clock signal, $Z_n$ is a state of the first data signal following an $n^{th}$ trailing edge of the sampling clock signal, $Z_{n-1}$ is a state of the first data signal following an $(n-1)^{th}$ trailing edge of the sampling clock signal, $Z_{n-2}$ is a state of the first data signal following an $(n-2)^{th}$ trailing edge of the sampling clock signal, $S_{n-1}$ is a state of the second data signal following the $(n-1)^{th}$ trailing edge of the sampling clock signal, and $\Delta_+$ and $\Delta_-$ are constants.

An adaptation control unit 52 employing this algorithm increments or decrements the amplifier gain only when it detects a state change in the first data signal $Z_n$. While this transfer function requires more hardware to implement than the transfer function implemented by the adaptation control unit of FIG. 12, it reduces variation in signal G, thereby reducing noise in compensation signal X.

Adaptive Feedback Equalization

Figure 4:
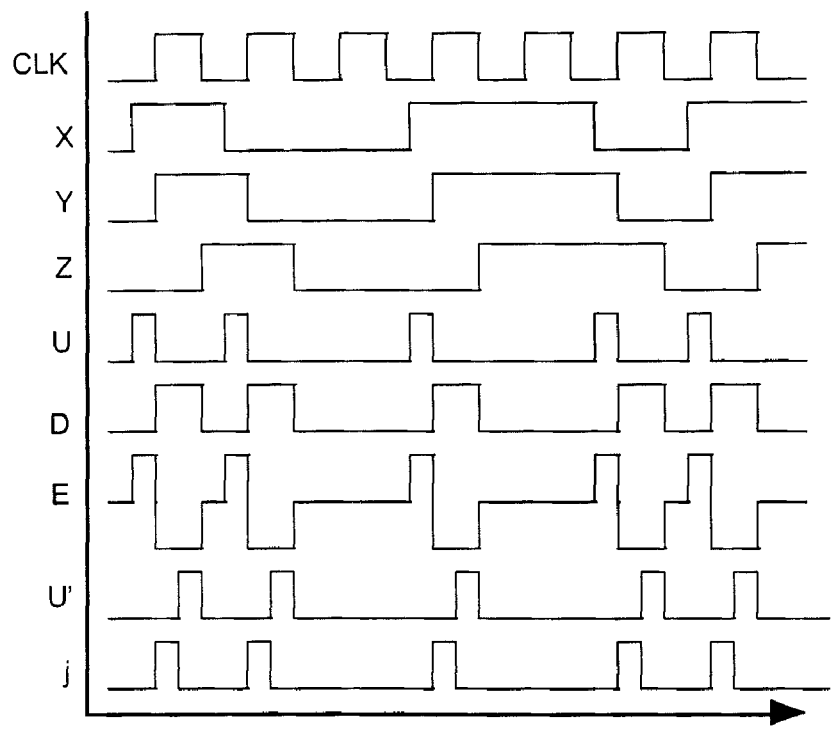
FIGS. 4-7 are timing diagrams illustrating behavior of signals produced by the CDR unit of FIG. 2.
Figure 5:
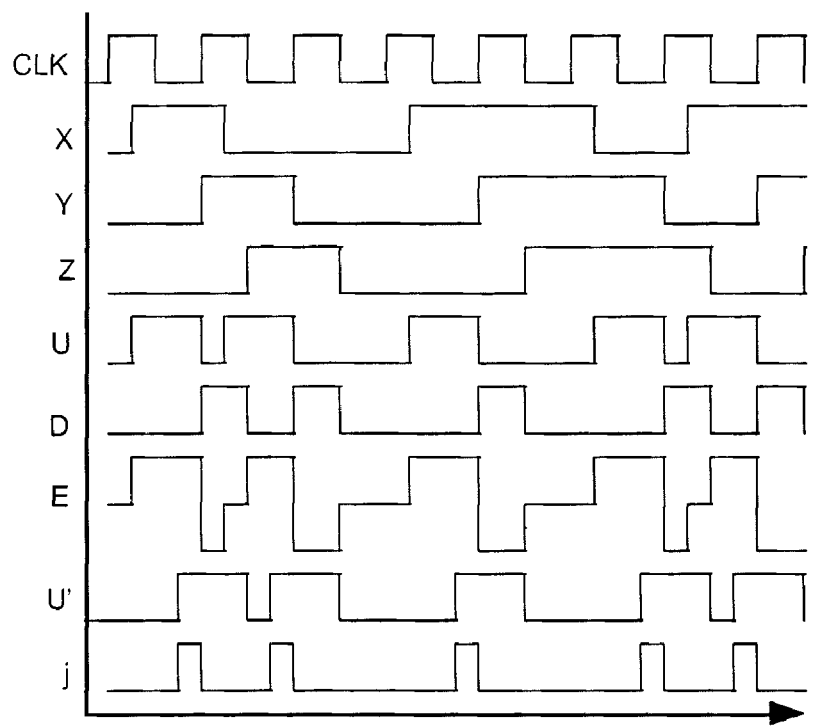
Figure 6:
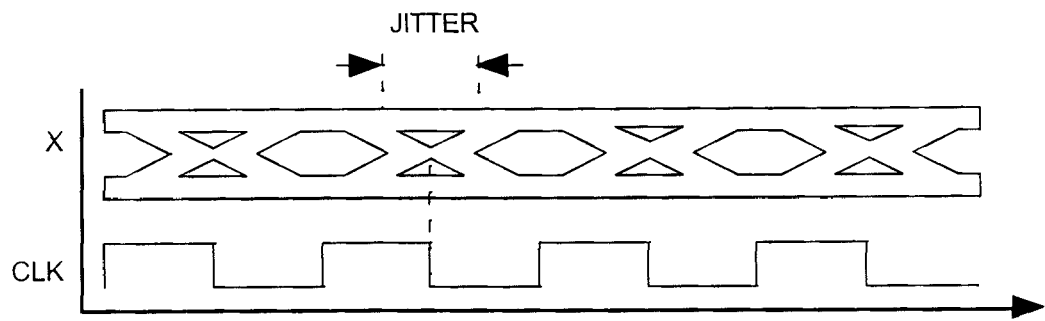
Figure 7:
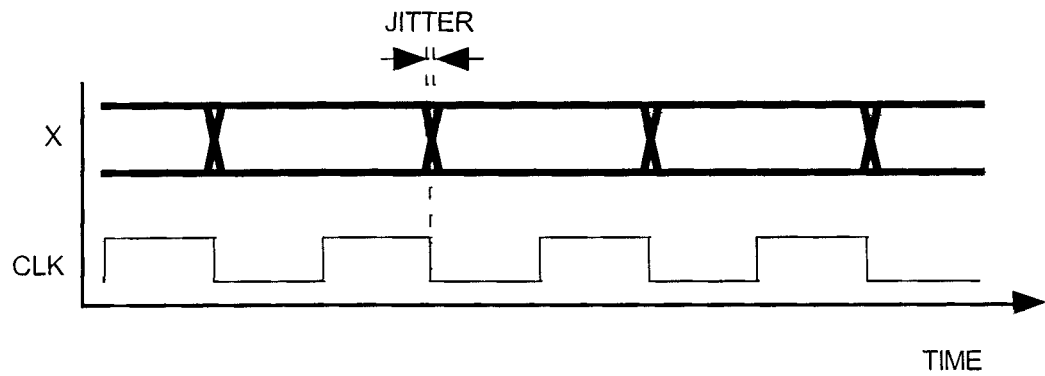
Figure 8:
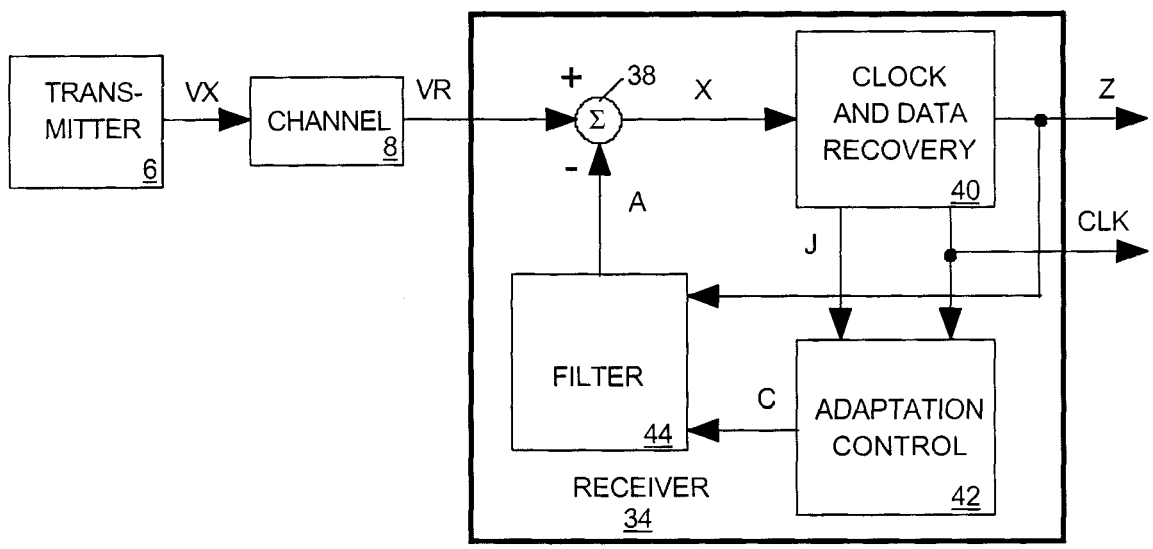
FIG. 8 illustrates another prior art communication system in block diagram form.
Figure 13:
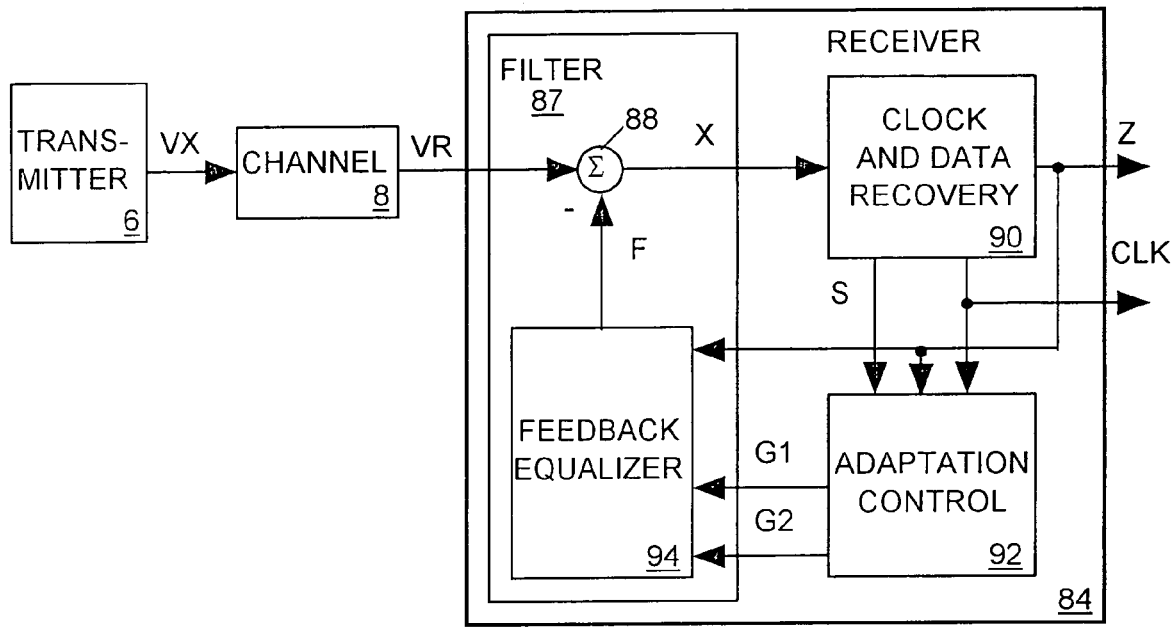
FIG. 13 illustrates in block diagram form a communication system including a receiver employing an adaptive feedback equalization system in accordance with the invention.

FIG. 13 illustrates a receiver 84 for carrying out the same function receiver 46 of FIG. 4 but while receiver 46 employs an adaptive feed-forward equalization system to compensate for ISI distortion, receiver 84 employs an adaptive feedback equalization system. Receiver 84 includes a filter 87 includes a summing amplifier 88 for offsetting received signal VR by an offset signal F to produce a compensated signal X. A CDR unit 90, suitably similar to CDR unit 50 of FIG. 10, processes compensated signal X to produce first and second data signals Z and S and sampling clock signal CLK in a similar manner. An adaptation control unit 92 processes first and second signals S and Z to generate two filter control signals G1 and G2 supplied to a feedback equalizer unit 94.

Figure 14:
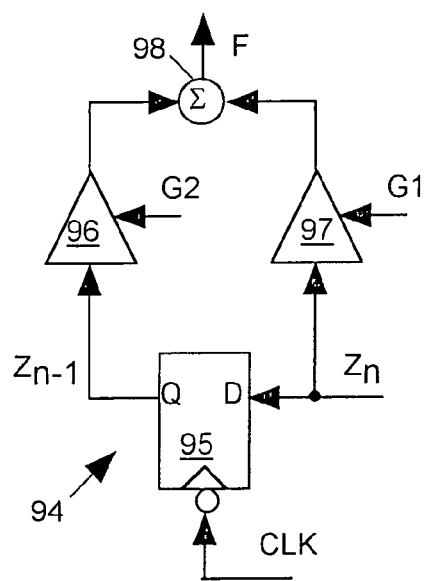
FIG. 14 illustrates the feedback equalizer unit of FIG. 13 in more detailed block diagram form.

FIG. 14 illustrates feedback equalizer unit 94 of FIG. 13 in more detail. Producing the offset signal F signal input to summing amplifier 88 as functions of the G1, G2 and Z signals, feedback equalizer unit 94 suitably includes a latch 95, a pair of amplifiers 96 and 97 having gains controlled by filter control signals G1 and G2, and a summing amplifier 98. First data signal Z drives amplifier 97. The output of latch 95, representing the state of first data signal Z on each trailing edge of the CLK signal, provides an amplifier 96 input. Summing amplifier 98 generates offset signal F as a sum of outputs of amplifiers 96 and 97. Adaptation control circuit 92 of FIG. 13 suitably implements, for example, the following adaptation algorithm:

$$G1_{n+1}=G1_n+\Delta_+ \text{ when } S_{n-1}=Z_{n-2}, \text{ else } G1_n+1=G1_n-\Delta_-$$

$$G2_{n+2}=G2_n+\Delta_+ \text{ when } S_{n-1}=Z_{n-3}, \text{ else } G2_n+2=G2_n-\Delta_-$$

where $G1_n$ is a magnitude of the first filter control signal during an $n^{th}$ sampling clock signal cycle, $G1_{n+1}$ is a magnitude of the first filter control signal during an $(n+1)^{th}$ sampling clock signal cycle, $G2_n$ is a magnitude of the second filter control signal during the $n^{th}$ sampling clock signal cycle, $G2_{n+1}$ is a magnitude of the second filter control signal during the $(n+1)^{th}$ sampling clock signal cycle, $Z_{n-2}$ is a state of the first data signal following an $(n-2)^{th}$ trailing edge of the sampling clock signal $Z_{n-3}$ is a state of the first data signal following an $(n-3)^{th}$ trailing edge of the sampling clock signal, $S_{n-1}$ is a state of the second data signal following an $(n-1)^{th}$ trailing edge of the sampling clock signal, and $\Delta_+$, and $\Delta_-$ are constants.

Adaptation control circuit 92 increases G1 when $S_{n-1}$ is of the same sign as $Z_{n-2}$ because this indicates that signal X is under-compensated. Otherwise, adaptation control circuit 92 considers signal X to be over-compensated and decreases G1. Similarly, adaptation control circuit 92 increases G2 when $S_{n-1}$ is of the same sign as $Z_{n-3}$ because this indicates that signal X is under-compensated. Otherwise, adaptation control circuit 92 considers signal X to be over-compensated and decreases G2.

Thus have been described exemplary embodiments of a receiver in accordance with the invention including a system for equalizing a received signal VR that is a low-pass filtered version of a transmitted signal VX to substantially compensate for ISI distortion in the received signal. Rather than controlling the amount of compensation based on a jitter estimate signal derived from the compensated signal X, the equalization system in accordance with the invention controls the amount of ISI compensation based on comparisons of samples (signal Z) of the compensated signal X acquired on leading edges of the sampling clock signal and samples (signal S) of signal X acquired on the trailing edges of the sample clock. Since the hardware (one latch) needed to generate and process data signals S and Z is relatively simple and inexpensive compared to the hardware prior art equalization systems need to generate and process a jitter estimate signal, the invention reduces equalization system costs.

The foregoing specification and the drawings depict exemplary embodiments of the best modes of practicing the invention, and elements or steps of the depicted best modes exemplify the elements or steps of the invention as recited in the appended claims. However, those of skill in the art will appreciate that the exemplary embodiments can be modified in various ways without departing from the true spirit of the invention. For example receivers 46 and 84 of FIGS. 9 and 12 could be modified to include conventional systems for compensating for other types of channel distortion such as, for example, insertion losses or baseline wander. Also, while the specification above describes examples of suitable transfer functions and/or architectures for various components of receivers 46 and 84 such as filters, CDR units, adaptation control units and equalizers, those of skill in the art will appreciate that the transfer functions and internal architectures of such components are matters of design choice and that other component internal architectures and transfer functions could be employed without altering the basic function of those components within the receivers.

The appended claims are therefore intended to apply to any mode of practicing the invention comprising the combination of elements or steps as described in any one of the claims, including elements or steps that are functional equivalents of the example elements or steps of the exemplary embodiment(s) of the invention depicted in the specification and drawings.

The invention claimed is:

1. For a communication system wherein a transmitted signal is distorted to become a received signal, wherein the transmitted signal comprises a sequence of data cycles of uniform duration, wherein during a portion of some data cycles the transmitted signal is of substantially constant high magnitude and during a portion of all other data cycles the transmitted signal is of substantially constant low magnitude, such that a pattern of high and low magnitudes represents a sequence of symbols, a method for processing the received signal to produce a first data signal representing the sequence of symbols, the method comprising the steps of:

filtering the received signal with a transfer function controlled by at least one filter control signal to produce a compensated signal;

processing the compensated signal to generate a sampling clock signal having a plurality of successive cycles of said uniform duration wherein a leading edge of the sampling clock signal occurs at a start of each sampling clock signal cycle and a trailing edge of the sampling clock signal occurs substantially at a middle of each sampling clock signal cycle;

generating the first data signal having successive states representing magnitudes of the compensated signal on successive leading edges of the sampling clock signal;

generating a second data signal having successive states representing magnitudes of the compensated signal on successive trailing edges of the sampling clock signal; and generating the at least one filter control signal as a function of the first and second data signals.

2. The method in accordance with claim 1 wherein the step of filtering the received signal comprises attenuating low frequency components of the received signal by an amount that is a function of the at least one filter control signal to produce the compensated signal.

3. The method in accordance with claim 1 wherein the step of filtering the received signal comprises amplifying high frequency components of the received signal by an amount that is a function of the at least one filter control signal to produce the compensated signal.

4. The method in accordance with claim 1 wherein the step of filtering the received signal comprises the substeps of:

generating an offset signal as a function of the received signal and of the at least one filter control signal; and subtracting the offset signal from the received signal to produce the compensated signal.

5. The method in accordance with claim 1 wherein the step of filtering the received signal comprises the substeps of:

generating an offset signal as a function of the received signal and of the at least one filter control signal; and adding the offset signal to the received signal to produce the compensated signal.

6. The method in accordance with claim 1 wherein the step of filtering the received signal comprises the substeps of:

generating an offset signal as a function of the first data signal and of the at least one filter control signal, and subtracting the offset signal from the received signal to produce the compensated signal.

7. The method in accordance with claim 1 wherein the at least one filter control signal is generated as the following function of the first and second data signals:

$$G_{n+1}=G_n, \text{ when } Z_n=Z_{n-1},$$

$$G_{n+1}=G_n+\Delta_+ \text{ when } S_{n-1}=Z_{n-2}, \text{ else}$$

$$G_{n+1}=G_n-\Delta_-$$

wherein $G_n$ is a magnitude of the one filter control signal during an $n^{th}$ sampling clock signal cycle, $G_{n+1}$ is a magnitude of the one filter control signal during an $(n+1)^{th}$ sampling clock signal, $Z_n$ is a state of the first data signal following an $n^{th}$ trailing edge of the sampling clock signal, $Z_{n-1}$ is a state of the first data signal following an $(n-1)^{th}$ trailing edge of the sampling clock signal, $Z_{n-2}$ is a state of the first data signal following an $(n-2)^{th}$ trailing edge of the sampling clock signal, $S_{n-1}$ is a state of the second data signal following the $(n-1)^{th}$ trailing edge of the sampling clock signal, and $\Delta_+$ and $\Delta_-$ are constants.

8. The method in accordance with claim 1 wherein the step of generating the first data signal comprises the substeps of:
   sampling the compensated signal on each leading edge of the compensated signal to produce a sample signal and the second data signal; and
   sampling the sample signal on each trailing edge of the compensated signal to produce the first data signal.

9. The method in accordance with claim 1 wherein the step of generating a second data signal comprises sampling the compensated signal on each trailing edge of the compensated signal to produce the second data signal.

10. The method in accordance with claim 1
   wherein the step of generating the first data signal comprises responding to trailing edges of the sampling clock signal by driving the first data signal to a succession of first states, wherein each first state corresponds to a separate leading edge of the sampling clock signal and represents a magnitude of the compensated signal on occurrence of the first state's corresponding sampling clock signal leading edge, and
   wherein the step of generating a second data signal comprises responding to trailing edges of the sampling clock signal by generating a second data signal by driving the second data signal to a succession of second states, wherein each second state corresponds to a separate trailing edge of the sampling clock signal and represents a magnitude of the compensated signal on occurrence of the second state's corresponding sampling clock trailing edge.

11. For a communication system wherein a transmitted signal is distorted to become a received signal, wherein the transmitted signal comprises a sequence of data cycles of uniform duration representing a sequence of transmitted symbols, wherein during a middle portion of some data cycles the transmitted signal is of substantially constant high magnitude and during a middle portion of all other data cycles the transmitted signal is of substantially constant low magnitude, an apparatus for processing the received signal to produce a first data signal representing the sequence of transmitted symbols, the apparatus comprising:
   a first circuit for filtering the received signal with a transfer function controlled by at least one filter control signal to produce a compensated signal;
   a second circuit for processing the compensated signal to generate a sampling clock signal having a plurality of successive cycles of substantially uniform duration wherein a leading edge of the sampling clock signal occurs at a start of each sampling clock signal cycle and a trailing edge of the sampling clock signal occurs substantially at a middle of each sampling clock signal cycle;
   a third circuit for generating the first data signal and a second data signal, wherein successive states of the first data signal represent sampled magnitudes of the compensated signal on successive leading edges of the sampling clock signal, wherein successive states of the second data signal represent sampled magnitudes of the compensated signal on successive trailing edges of the sampling clock signal; and a fourth circuit for generating the at least one filter control signal as a function of the first and second data signals.

12. The apparatus in accordance with claim 11 wherein the first circuit comprises attenuating low frequency components of the received signal by an amount that is a function of the at least one filter control signal to produce the compensated signal.

13. The apparatus in accordance with claim 11 wherein the first circuit amplifies high frequency components of the received signal by an amount that is a function of the at least one filter control signal to produce the compensated signal.

14. The apparatus in accordance with claim 11 wherein the first circuit generates an offset signal as a function of the received signal and of the at least one filter control signal, and subtracts the offset signal from the received signal to produce the compensated signal.

15. The apparatus in accordance with claim 11 wherein the first circuit generates an offset signal as a function of the received signal and of the at least one filter control signal and adds the offset signal to the received signal to produce the compensated signal.

16. The apparatus in accordance with claim 11 wherein the first circuit generates an offset signal as a function of the first data signal and of the at least one filter control signal, and subtracts the offset signal from the received signal to produce the compensated signal.

17. The apparatus in accordance with claim 11 wherein the fourth circuit generates the at least one filter control signal as the following function of the first and second data signals:

$$G_{n+1}=G_n, \text{ when } Z_n=Z_{n-1},$$

$$G_{n+1}=G_n+\Delta \text{ when } S_{n-1}=Z_{n-2}, \text{ else}$$

$$G_{n+1}=G_n-\Delta_-$$

wherein
   $G_n$ is a magnitude of the one filter control signal during an $n^{th}$ sampling clock signal cycle,
   $G_{n+1}$ is a magnitude of the one filter control signal during an $(n+1)^{th}$ sampling clock signal,
   $Z_n$ is a state of the first data signal following an $n^{th}$ trailing edge of the sampling clock signal,
   $Z_{n-1}$ is a state of the first data signal following an $(n-1)^{th}$ trailing edge of the sampling clock signal,
   $Z_{n-2}$ is a state of the first data signal following an $(n-2)^{th}$ trailing edge of the sampling clock signal,
   $S_{n-1}$ is a state of the second data signal following the $(n-1)^{th}$ trailing edge of the sampling clock signal, and
   $\Delta_+$ and $\Delta_-$ are constants.

18. The apparatus in accordance with claim 11 wherein the third circuit samples the compensated signal on each leading edge of the compensated signal to produce a sample signal and the second data signal, and samples the sample signal on each trailing edge of the compensated signal to produce the first data signal.

19. The apparatus in accordance with claim 11 wherein the third circuit samples the compensated signal on each trailing edge of the compensated signal to produce the second data signal.

20. The apparatus in accordance with claim 11
   wherein the third circuit responds to trailing edges of the sampling clock signal by driving the first data signal to a succession of first states, wherein each first state corresponds to a separate leading edge of the sampling clock signal and represents a magnitude of the compensated signal on occurrence of the first state's corresponding sampling clock signal leading edge, and wherein the third circuit responds to trailing edges of the sampling clock signal by generating a second data signal by driving the second data signal to a succession of second states, wherein each second state corresponds to a separate trailing edge of the sampling clock signal and represents a magnitude of the compensated signal on occurrence of the second state's corresponding sampling clock trailing edge.

* * * * *